United States Patent [19]
Komai et al.

[11] Patent Number: 6,099,953
[45] Date of Patent: Aug. 8, 2000

[54] THERMOPLASTIC RESIN-COATED ALUMINUM ALLOY PLATE, AND PROCESS AND APPARATUS FOR PRODUCING THE SAME

[75] Inventors: Masao Komai, Yamaguchi-ken; Ayumu Taniguchi, Tokyo; Keiichi Shimizu, Yamaguchi-ken; Jun-ichi Tanabe, Yamaguchi-ken; Shinji Shirai, Yamaguchi-ken, all of Japan

[73] Assignee: Toyo Kohan Co., Ltd., Tokyo, Japan

[21] Appl. No.: 09/155,346

[22] PCT Filed: Mar. 24, 1997

[86] PCT No.: PCT/JP97/00966

§ 371 Date: May 13, 1999

§ 102(e) Date: May 13, 1999

[87] PCT Pub. No.: WO97/35716

PCT Pub. Date: Oct. 2, 1997

[30] Foreign Application Priority Data

Mar. 27, 1996 [JP] Japan ................................. 8-095828

[51] Int. Cl.$^7$ ..................................... B32B 15/08
[52] U.S. Cl. ..................... 428/312.8; 428/315.7; 428/315.9; 428/319.7; 428/458; 428/543; 427/302; 427/327; 425/506
[58] Field of Search ............... 428/312.8, 315.7, 428/315.9, 319.7, 458, 543; 425/506; 427/302, 327

[56] References Cited

U.S. PATENT DOCUMENTS

| | | | |
|---|---|---|---|
| 4,962,659 | 10/1990 | Imazu et al. | 72/349 |
| 5,100,107 | 3/1992 | Ishinabe et al. | 220/669 |
| 5,316,777 | 5/1994 | Toyoda et al. | 426/87 |
| 6,017,599 | 1/2000 | Sakamoto et al. | 428/35.8 |

FOREIGN PATENT DOCUMENTS

| | | |
|---|---|---|
| 62-227723 | 10/1987 | Japan . |
| 344496 | 2/1991 | Japan . |
| 6267638 | 9/1994 | Japan . |
| 6272015 | 9/1994 | Japan . |
| 790606 | 4/1995 | Japan . |

*Primary Examiner*—Blaine Copenheaver
*Assistant Examiner*—Ula Ruddock
*Attorney, Agent, or Firm*—Browdy and Neimark

[57] ABSTRACT

A thermoplastic resin-coated aluminum alloy plate having so high a processing adhesion that the laminated thermoplastic resin layer is not separated therefrom even when the plate is subjected to a severe forming process in which the plate is deep-drawn, stretched and then ironed. A process and an apparatus for producing the same are also disclosed. An aluminum alloy plate is treated with an alkali solution and an acid solution in order so as to put the surface of the plate in a special condition. The resultant plate is subjected to anodic electrolysis using a direct current in an acid solution containing one or more of inorganic acid, such as sulfuric acid and an organic acid, such as carboxylic acid or hydroxy carboxylic acid. Alternatively, the resultant plate is subjected to a treatment using hot water of above 60° C., boiling water, or water vapor so as to form a uniform hydration oxide film of 2–10 nm in thickness. The alloy plate is coated with a thermoplastic resin. This enables the thermoplastic resin-coated aluminum alloy plate to have so high a processing adhesion that permits the plate to withstand a severe forming process.

66 Claims, No Drawings

THERMOPLASTIC RESIN-COATED ALUMINUM ALLOY PLATE, AND PROCESS AND APPARATUS FOR PRODUCING THE SAME

TECHNICAL FIELD

The present invention relates to a process for producing a thermoplastic resin-coated aluminum alloy sheet intended mainly for the application thereof as material for a can, and an apparatus for producing the same. More specifically, it relates to a thermoplastic resin-coated aluminum alloy sheet used as material for a can being excellent in the formability, the adhesion after forming, the corrosion resistance, the impact resistance, and the flavor-preservability, and which is used not only as popular material for a can such as for a can-top and a drawn can, but also for purposes of cans such as a drawn and ironed can, a can produced by the drawing forming process and then the stretching process, and a can made through the drawing forming process, thereafter the stretching forming process, and then the ironing process, for which the severe formability, the adhesion after forming, and the adhesion after the retort-treatment are required, and an apparatus for producing the same.

BACKGROUND ART

Thermoplastic resin, for example polyester resin laminated-aluminum alloy sheet has been already used for material for a can. However, when the adhesion between a laminated thermoplastic resin layer sheet and the aluminum alloy sheet is insufficient, there is a case where the laminated thermoplastic resin layer peels off from the aluminum alloy sheet during the forming process, or the corrosion of the aluminum alloy sheet is advanced from the portion where the adhesion is insufficient. The adhesion is affected by the formability of aluminum alloy sheet and the properties of the laminated thermoplastic resin layer, and further is largely affected by the condition of the surface of the aluminum alloy sheet. Therefore, in order to improve the adhesion between an aluminum alloy sheet and a thermoplastic- resin layer or coating film, an aluminum alloy sheet has conventionally been subjected to the following surface-treatment.
(1) A method in which an aluminum alloy sheet is subjected to phosphoric acid treatment or chromic acid treatment.
(2) A method in which a thermosetting resin primer is coated on one side of the thermoplastic resin film or aluminum alloy sheet.
(3) A method in which an anodic oxide film is formed on the aluminum alloy sheet by anodic oxidation, the oxide film by anodic oxidation having micro pores with the diameter 2000 Angstrom or more, and the depth 5 $\mu$m or less and the occupied area rate by micro pores of 5 to 60% (Japanese Laid-Open Publication No. Hei 3-44496).
(4) A method in which after rinsing of an aluminum alloy sheet, said sheet is heated to the temperature of from 250° C. to 650° C. for two hours or more in the atmosphere to form an oxide film 20 Angstrom or more (Japanese Laid-Open Publication No. Hei 6-272015).
(5) A method in which after rinsing of an aluminum alloy sheet, said sheet is subjected to an electrolytical treatment using alternating current in an alkali solution to form an oxide film having a thickness of 500 to 5000 Angstrom and having branched micro pores (Japanese Laid-Open Publication No. Hei 6-267638).

However, in the above-mentioned method (1) of phosphoric acid treatment or chromic acid treatment, since phosphate, chromate, fluoric compound or others is mainly used as the chemical treatment solution to improve the paint adhesion, the treatment is widely used. However, it requires an enormous draining equipment for the draining of treatment solution in order to prevent the environmental pollution. Therefore, method (1) is undesirable from the aspect of preservation of the environment. Further, in the above-mentioned method (2) of coating with the adhesive primer, cost is increased by primer coating, and besides the process for thermosetting of coating film is additionally needed, so it is undesirable from the aspect of productivity. Further, the equipment for exhausting organic solvent is needed. As for the above-mentioned method (3) of forming an oxide film by anodic oxidation having specific micro pores by using a chromic acid solution, a long time is required for forming the oxide film by anodic oxidation, so it is undesirable from the aspect of productivity. Further, when heavy forming process is carried out, the laminated thermoplastic resin layer occasionally peels off from the aluminum alloy sheet. Furthermore, a draining equipment is needed for the prevention of the environmental pollution. In the above-mentioned method (4) of forming an oxide film by heating the cleaned aluminum alloy sheet for a long time in the atmosphere, when a heavy forming process is carried out, the laminated thermoplastic resin layer peels off from the aluminum alloy sheet as in method (3), and a long time is taken for forming of an oxide film, so it is undesirable from the aspect of productivity. Further, in the above-mentioned method (5) of forming, an oxide film of 500 to 5000 Angstrom by electrolyzing an aluminum alloy sheet by using alternating current in alkali solution, the surface treatment of the aluminum alloy sheet can be continuously carried out by the electrolysis in a short amount of time, and the effective adhesion after forming of the laminated resin film can be obtained. However, after the resin film is laminated on the treated aluminum alloy sheet, when said sheet is subjected to a drawing forming process, followed by a stretching process, further followed by an ironing process, the laminated resin film is peels off from the aluminum alloy sheet. Therefore, it is hard to say that the adhesion after forming is sufficient and the resin-coated aluminum alloy sheet cannot withstand severe forming process.

The objective of the present invention aims to achieve is to provide a process and apparatus for producing a thermoplastic resin-coated aluminum alloy sheet having excellent adhesion from which the laminated thermoplastic resin layer does not peel off even when being subjected to a severe forming process, as compared with a conventional surface-treated aluminum alloy sheet as mentioned herein above, and further from which the laminated thermoplastic resin layer does not peel off even when it is subjected to high temperature steam-treatment (retort treatment) of 100° C. to 300° C. Concretely, the present invention aims at providing an aluminum alloy sheet having excellent adhesion after forming in which the laminated thermoplastic resin layer does not peel off even when the sheet is subjected to a drawing forming process, followed by a stretch-forming process, and further followed by an ironing process, at a low cost. Further the present invention aims at providing a process and an apparatus for producing the same which enable high speed production and are environmental friendly.

DISCLOSURE OF INVENTION

A thermoplastic resin coated-aluminum alloy sheet of the present invention is characterized in that an aluminum alloy sheet is subjected to a treatment with alkaline solution, and then to a treatment with acid solution so as to put the surface of the aluminum alloy sheet in such a condition that the increase rate of the specific surface area is 3 to 30%. Then the resultant sheet is subjected to an anodic oxidation treatment, thereafter at least one side of said aluminum alloy sheet is laminated with thermoplastic resin. The thickness of the oxide film formed by the anodic oxidation treatment is desirably 2 to 10 nm.

Further, it is desirable to subject the aluminum alloy sheet to a hydrated oxide film forming-treatment instead of an anodic oxidation treatment. A thermoplastic resin coated-aluminum alloy sheet is characterized in that an aluminum alloy sheet is subjected to a treatment with alkali solution, and then to a treatment with acid solution so as to put the surface of the aluminum alloy sheet in such a condition that the increase rate of the specific surface area is 3 to 30%. Then the resultant base sheet is subjected to a hydrated oxide film forming-treatment with hot water of above 60° C., boiling water or water vapor so as to form a hydrated oxide film, thereafter at least one side of said aluminum alloy sheet is laminated with thermoplastic resin. The thickness of the hydrated oxide film formed by the hydrated oxide film forming-treatment is desirably 2 to 20 nm.

Micro pores are formed on the surface of the aluminum alloy sheet to be laminated with a thermoplastic resin after a treatment with alkali solution followed by a treatment with acid solution. It is desirable that the diameter of the micro pore is 50 to 3000 nm, the maximum depth thereof is 1000 nm or less, and the occupied area rate by micro pores is 10 to 95%, and that the micro pores are formed from the surface of the aluminum alloy sheet in the direction of thickness with an average diameter of 200 to 900 nm, and a depth ½ or less of the diameter.

Further, it is desirable that the thermoplastic resin is polyethylene terephthalate, copolymerized polyester resin having, as a main component, ethylene terephtalate units, polyester resin having, as a main component, butylene terephthalate units, or composite resin of blend polymer of these polyester resins or multi-layered resin.

Further still, it is desirable that the thermoplastic resin to be laminated is a multi-layered one comprising an upper layer, a lower layer and an intermediate layer, in which the upper layer and the lower layer are polyester resin, and the intermediate layer is blend polymer of polyester resin with bisphenol A polycarbonate resin or bisphenol A polycarbonate resin.

A process for producing a thermoplastic resin coated-aluminum alloy sheet of the present invention is characterized in that a strip of aluminum alloy is continuously subjected to a treatment with alkali solution, rinsing, a treatment with acid solution, rinsing, an anodic oxidation treatment or a hydrated oxide film forming-treatment, rinsing and drying, followed by lamination with thermoplastic resin. It is desirable that alkali solution is aqueous solution containing mainly 10 to 200 g/l of one or more selected from the group consisting of hydroxide, carbonate, bicarbonate, phosphate, silicate and borate of alkali metal or ammonium, and acid solution is aqueous solution containing mainly 10 to 300 g/l of one or more selected from the group consisting of sulfuric acid, hydrochloric acid, nitric acid, phosphoric acid, boric acid, carboxylic acid and hydroxy carboxylic acid. It is desirable that the carboxylic acid is oxalic acid or acetic acid, and the hydroxy carboxylic acid is citric acid, tartaric acid or lactic acid. Further, it is desirable that the treatment with alkali solution is a treatment in which the aluminum alloy sheet is dipped into alkali solution or a treatment in which alkali solution is sprayed on the aluminum alloy sheet, and the treatment with acid solution is a treatment in which the aluminum alloy sheet is dipped into acid solution or a treatment in which acid solution is sprayed on the aluminum alloy sheet.

It is desirable that for the anodic oxidation treatment, the aluminum alloy sheet is subjected to the anodic oxidation treatment using acid solution containing mainly 10 to 100 g/l of one or more selected from the group consisting of sulfuric acid, phosphoric acid, carboxylic acid and hydroxy carboxylic acid at a temperature of 30 to 80° C. and with current density of 2.5 to 50 A/dm2.

An apparatus for producing thermoplastic resin coated-aluminum alloy sheet of the present invention is characterized in that an alkaline solution treatment tank, a rinsing tank, an acid solution treatment tank, a rinsing tank, an anodic oxidation treatment tank, a rinsing tank, a drying device and a thermoplastic resin laminating equipment are serially arranged in order. Further, an apparatus for producing thermoplastic resin coated-aluminum alloy sheet is characterized in that a hydrated oxide film forming-treatment tank is provided instead of an anodic oxidation treatment tank, and the following rinsing tank.

Best Mode for Carrying Out the Invention

An aluminum alloy sheet was dipped into an alkali solution containing mainly sodium hydroxide or alkali solution containing surface active agent, or the above-mentioned alkali solutions were sprayed on an aluminum alloy sheet, and after rinsing, the sheet was dipped into acid solution such as sulfuric acid, or the acid solution was sprayed to the aluminum alloy sheet. After rinsing, the sheet was further subjected to an anodic oxidation treatment for a short time using acid solution such as inorganic acid such as sulfuric acid, and organic acid such as carboxylic acid, hydroxy carboxylic acid, rinsing and drying after which the sheet was heated to a temperature of above melting point of the thermoplastic resin and was laminated with thermoplastic resin by a known film laminating method or a molten resin extrusion laminating method. The resultant thermoplastic resin coated-aluminum alloy sheet was found to have excellent adhesion after forming and the laminated thermoplastic resin layer did not peel off even when the thermoplastic resin coated-aluminum alloy sheet was subjected to a severe forming process in which the sheet was deep-drawn, stretched and ironed. In the same manner, it was found that the same effect can be obtained by subjecting the sheet to a hydrated oxide film forming-treatment instead of short-time anodic oxidation treatment.

The present invention is described in detail. First, an aluminum alloy sheet used in the present invention is not particularly limited, so far as the aluminum alloy sheet can withstand a severe forming process, which is the object of the present invention, in which the sheet is deep-drawn, stretched and ironed. However, an aluminum alloy sheet of 3000 series and 5000 series having the thickness of 0.20 to 0.35 mm widely used for cans are desirable from the aspect of cost and formability. Thermoplastic resin is laminated on at least one side of an aluminum alloy sheet used in the present invention, and thereafter the sheet is subjected to a forming process. Therefore, it is not needed to consider solid-state lubrication of the surface of an aluminum alloy sheet as in aluminum alloy sheet used for drawn and ironed can, DI can. The aluminum alloy sheet may be selected by considering the electrolytic etching property, the surface-treatment property of the surface of the sheet, and the adhesion after forming of the sheet to be laminated with thermoplastic resin.

Then, the state of the surface of an aluminum alloy sheet as the base sheet to be laminated with thermoplastic resin is explained. In the present invention, an aluminum alloy sheet is subjected to a treatment with alkali solution and a treatment with acid solution so as to put the surface of the aluminum alloy sheet in such a condition that the increase rate of the specific surface area is 3 to 30%, Then, by subjecting the sheet to an anodic oxidation treatment so as to form a uniform oxide film on the surface of the aluminum alloy sheet, an aluminum alloy sheet having a the specific surface condition can be obtained, and thereby the aluminum alloy sheet having excellent adhesion that the laminated thermoplastic resin layer does not peel off from the sheet even when the laminate is subjected to a severe forming, and which can withstand retort treatment can be obtained. It is possible to obtain a surface having the specific surface area within the above-mentioned range by a treatment with alkali solution alone, or by a treatment with acid solution alone. The thus obtained aluminum alloy sheet will have excellent adhesion in which the laminated resin layer does not peel off even in a severe forming process, which is an object of the present invention. However, the adhesion after the retort treatment is inferior, therefore it is hard to use such a sheet for a can containing coffee or tea, which is subjected to a retort treatment after content is packed into a can. In the same manner, when the sheet is subjected to a hydrated oxide film forming-treatment so as to form a hydrated oxide having the thickness of 2 to 20 nm, instead of an anodic oxidation treatment, the same effect can be obtained. It is unknown why the formation of thin and uniform oxide film by anodic oxidation or the formation of hydrated oxide film is effective in the adhesion after a retort treatment, but it is supposed that the adhesive interface between the sheet with thermoplastic resin is not affected by steam of high temperature in retort treatment.

The surface condition of the aluminum alloy sheet formed by a treatment with alkali solution and a treatment with acid solution prior to a hydrated oxide film forming-treatment can be determined, for example, by the measurement using the under-mentioned atomic force microscope. Concretely, the five arbitrary points on the surface of the aluminum alloy sheet are measured. When the increase rate of the specific surface area is 3 to 30%, and more preferably 4 to 20%, the aluminum alloy sheet having excellent adhesion after forming that the laminated thermoplastic resin layer does not peel off at all from the sheet, even when the sheet is subjected to a severe forming process can be objected which is the object of the present invention. Further, it is desirable that the diameter of formed micro pores is 50 to 300 nm, the maximum depth is 1000 nm or less, and the occupied area rate by micro pores is 10 to 95%. Further, it is preferable that the diameter of micro pores is 50 to 1200 nm, the maximum depth thereof is 600 nm or less, and the occupied area rate by micro pores is 20 to 90%. Furthermore, it is desirable that the average diameter of said micro pores is 200 to 900 nm.

The microscopic state of the surface of the aluminum alloy sheet is very important for the adhesion after forming of the laminated thermoplastic resin layer with the aluminum alloy sheet, The surface roughened by a conventional mechanical method, as well as the roughened surface formed by the electrolytic etching, is effective in the adhesion after forming of the roughened surface with the thermoplastic resin layer to be laminated. However, when the sheet is subjected to a severe forming process, the laminated thermoplastic resin layer peels off from the sheet. The reason for this is unknown. However, it is supposed that in these conventional treatments micro pores having deep concave or the depth over ½ of the diameter are formed so that molten thermoplastic resin cannot sufficiently penetrate into the hollow parts which form ruggedness on the aluminum alloy sheet, and therefore the anchoring effect cannot be sufficiently obtained. Namely, it is essential to form shallow micro pores with the depth of ½ or less of the diameter on the surface of the aluminum alloy sheet in the thickness direction. It is supposed that by such a manner, since thermoplastic resin layer penetrates sufficiently into micro pores to the bottom of the micro pores, and sufficient anchoring effect is obtained, the excellent adhesion of thermoplastic resin layer with the aluminum alloy sheet is seen even after the severe forming process. In other words it is essential for the surface condition of the aluminum alloy sheet laminated with thermoplastic resin layer to have a specific surface area in order to secure the excellent adhesion with the thermoplastic resin. "Surface area" in this context is different from the conventional concept of surface roughness measured by tracer method, but is more similar to a surface area of the state of surface on which micro ruggedness of nanometer order is formed, what is called the surface activation index.

Further, in the present invention, a specified surface condition of an aluminum alloy sheet is obtained by alkali solution treatment and acid solution treatment, and then forming an uniform oxide film of 2 to 10 nm thereon by anodic oxidation treatment. Thus, aluminum alloy sheet having excellent adhesion after forming that the laminated thermoplastic resin layer will not peel off even when subjected to severe forming and which withstands retort treatment is obtained.

However, when the formed anodic oxide film is thick, many cracks are formed on the anodic oxidation film during the forming, and the thermoplastic resin layer peels off. Therefore, such sheet is not suitable for practical use. In the same manner, the same effect can also be obtained by subjecting an aluminum alloy sheet to hydrated oxide film forming-treatment so as to form hydrated oxide film of 2 to 20 nm instead of anodic oxidation treatment. In this case, this thin hydrated oxidation film is a hydrated aluminum oxide film which shows Al—OH bond partially containing aluminum oxide showing the Al—O bond according to the measurement of XPS (X-ray photoelectron spectroscopy). It is unknown why in case of the hydrated oxide film, the thickness may be up to twice that of anodic oxide film, and an aluminum alloy sheet having the excellent adhesion in which the laminated thermoplastic resin layer does not peel off even when the sheet is subjected to a severe forming process, and which withstands a retort treatment is obtained. However, it is supposed to be due to the difference in the structure of the film. Namely, it is supposed that it is because cracks are hard to be formed in the hydrated oxide film showing the Al—OH bond during forming process, as compared with the anodic oxided film formed by aggressively oxidizing aluminum by anodic electrolysis, and thus the hydrated oxide film of up to 20 nm is effective in adhesion after forming. Further, it is supposed that because stable bond typified by hydrogen bond or covalent bond is formed between hydroxyl group of Al—OH and thermoplastic resin layer, the hydrated oxide film of up to 20 nm shows excellent adhesion after forming. In this case, since the thickness of anodic oxide film layer of 2 to 10 nm and the thickness of hydrated oxide film layer of 2 to 20 nm are thin and uniform, the change in the increase rate of the specific surface area, the diameter and the depth of micro pores, and the occupied area rate by micro pores before and after said treatment is almost not detected.

In the present invention, "the increase rate of the specific surface area of the aluminum alloy sheet" is the percentage of increase in the ratio of the surface area (real area) of a sample which is treated with alkali solution and further with acid solution to the surface area (projected area) of the sample which tentatively has no ruggedness. As for the actual measurement, an area of 5 $\mu$m square of the surface of the sample was measured with 512 pixels per line by an atomic force microscope "Nanoscope III a" manufactured by Digital Instruments Inc,. The measurement was made on five different visual fields, wherein the average of the measured values was defined as the actual surface area (numerator) A. The projected area (denominator=standard) B of the measured field which was assumed to be entirely flat was determined, and the increment of the ratio of A to B was calculated, and the increase rate of the specific area C % was defined as C %=(A/B−1)×100.

In the present invention, it has been previously stated that to set the increase rate of the specific surface area of the aluminum alloy sheet after being treated with alkali solution and further with acid solution to be between 3% and 30%, preferably between 4% and 20% shows remarkable improving effect on the adhesion after forming with the laminated thermoplastic resin layer, and is needed for obtaining the excellent adhesion after forming in which the laminated thermoplastic resin layer does not peel off from the aluminum alloy sheet even when being subjected to a severe forming process. However, when the increase rate of the specific surface area is less than 3%, concaves that show anchoring effect are not formed on the surface of the sheet, and almost no effect is observed on the adhesion after forming with the laminated thermoplastic resin layer. Further, when the increase rate of the specific surface area is exceeding 30%, the maximum depth of formed micro pores becomes remarkably large, and undesired effects on the adhesion after forming is caused, which is not desirable.

Further, it has been previously stated that in the present invention, not only the above-mentioned increase rate of the specific surface area, but also the diameter, the maximum depth of formed micro pores, the occupied area rate by micro pores, and the average diameter of micro pores are desirably in the above-said specified range. The reasons for limiting such values are the same. Namely, when the diameter of micro pores is less than 50 nm, and the occupied area rate by micro pores is less than 10%, it has no effect on the adhesion after forming with the laminated thermoplastic resin layer. When the diameter of micro pores is more than 3000 nm, the maximum depth thereof is more than 1000 nm, and the occupied area rate by micro pores is more than 95%, the surface of the sheet becomes too rough even in the microscopic observation.

Since the molten thermoplastic resin does not penetrate sufficiently into the dented portions, sufficient anchoring effect cannot be obtained, and so there is a fear of deteriorating of adhesion after forming, which is undesirable. As for the average diameter, when it is less than 200 nm, it is undesirable because the effect on the adhesion after forming with the laminated thermoplastic resin layer is not sufficient, whereas when it exceeds 900 nm, it is also undesirable since it is more likely to roughen the surface of the sheet. By the way, there is a relation between the diameter and the depth of micro pores and the occupied area rate by micro pores, wherein the larger the diameter becomes, the deeper the depth becomes. Further, when many pores are formed, namely when the occupied area rate by micro pores is increased, the diameter and the depth tend to be increased. In the actual measurement, after marks for reference were made at five points on the surface of a sample, in addition to the aforementioned occupied area rate by micro pores, the maximum depth was also measured by the atomic force microscope. Since there is a correlation between the maximum depth and the diameter, a longitudinal section of micro pores having the largest diameter in view was cut, the depth of the pore was measured, and defined as the maximum depth. Prior to this measurement, three pores, having the largest diameter were selected, and the depths were compared with each other. As a result, it was found that a micro pore having the largest diameter had the deepest depth. Accordingly, it was supposed that this measuring method in which the maximum depth was measured was appropriate. Further, as for the diameter of micro pores and the occupied area rate by micro pores, images of secondary electron beams corresponding to marks of reference on the surface of a sample within the same visual field as that measured by the atomic force microscope were photographed by the scanning electron microscope. Thereafter the diameter of micro pores, strictly speaking the diameter of a figure corresponding to a circle since micro pores were not genuine circles, the average diameter and the occupied area rate by micro pores were measured by the image analyzer "TOSPIX-U" manufactured by Toshiba Inc,.

Then, a process for producing a thermoplastic resin-coated aluminum alloy sheet according to the present invention is explained. First, aqueous solution mainly composed of one or more than one kind selected from the group consisting of hydroxide, carbonate, bicarbonate, phosphate, silicate and borate of alkalimetal or ammonium, or these alkali aqueous solutions containing a surface active agent is used for the treatment with aqueous solution of alkali. The main purpose of the treatment with alkali aqueous solution is to remove the grease adhered to the surface of the aluminum alloy sheet and to remove the oxide film formed on the surface by dissolving. The surface of the sheet is occasionally etched somewhat. Addition of the surface active agent is desirable since it improves the wettability and the degreasability of the aluminum alloy sheet by the alkali aqueous solution. The concentration of used compound is desirably in the range of 10 to 200 g/l, and more preferably in the range of 30 to 100 g/l. Further, the temperature of the alkali aqueous solution is desirably 30 to 80° C., and more preferably 45 to 60° C. For the method of treatment, a method in which an aluminum alloy sheet is dipped into the alkali aqueous solution or the alkali aqueous solution containing a surface active agent, or a method in which said alkali aqueous solution is sprayed on a aluminum alloy sheet is applied. A short duration of 1 to 30 seconds for the treatment is sufficient, but more preferably in the range of 3 to 15 second. A method of employing a direct current electrolysis or an alternating current electrolysis may also be considered. However, since this method requires an apparatus for electrolysis, it is undesirable from the aspect of cost. Further, in this method, there is a case where perforation by electrolysis locally proceeds in an aluminum alloy sheet. Therefore, this method is not suitable for obtaining an aluminum alloy sheet having the state of surface of the present invention. When the concentration of used alkaline compound is less than 10 g/l or when the temperature of alkali aqueous solution is below 30° C., a long time is taken for sufficiently removing the grease and oxide film existing on the surface of aluminum alloy sheet. Therefore, the continuous productivity of thermoplastic resin-coated aluminum alloy sheet according to the present invention is hindered, which is undesirable. Further, when the concentration of alkali compound exceeds 200 g/l or when the temperature of aqueous solution of alkali exceeds 80° C., the grease and oxide film existing on the surface of an aluminum alloy sheet can easily be removed, however, dissolution of the surface of an aluminum alloy sheet is promoted so as to decrease the thickness of the sheet, which is economically undesirable. Moreover, the aluminum alloy sheet is locally etched at times, and an aluminum alloy sheet having the state of surface needed in the present invention may not be obtained, which is undesirable. In general, when a highly concentrated alkali aqueous solution is used and the treatment is carried out at a high temperature, a short duration is sufficient. On the other hand, when lowly concentrated alkali aqueous solution is used and the treatment is carried out at a low temperature, a long time is taken for the treatment. Therefore, in the present invention, the concentration, the temperature of alkali aqueous solution and the duration of treatment are appropriately selected within a specified range.

Then, the treatment with acid aqueous solution carried out after rinsing is explained. For the treatment with acid aqueous solution, aqueous solution containing mainly one or more than one kind selected from the group consisting of sulfuric acid, nitric acid, hydrochloric acid and phosphoric acid is desirably used. Carboxylic acid, hydroxy carboxylic acid and the like can also be used for the treatment with acid aqueous solution. However, it is undesirable not only from the aspect of cost, but also because the chemical oxygen demand (COD) is high compared to inorganic acid such as sulfuric acid, and excessive cost is taken for the drainage treatment. The purpose of the treatment with acid aqueous solution is to remove smuts remaining on the surface of the sheet caused by the treatment with alkali aqueous solution, and at the same time to form the state of surface of an aluminum alloy sheet needed in the present invention where the aluminum alloy sheet has the increase rate of the specific area of 3 to 30%, and micro pores having diameter of 50 to 3000 nm, maximum depth of 1000 nm or less and the occupied area rate by micro pores of 10 to 95%. The concentration of used inorganic acid is desirably in the range of 10 to 300 g/l, more preferably in the range of 30 to 150 g/l. Further, the temperature of the acid aqueous solution is desirably 5 to 60° C., and more preferably 15 to 40° C. For the method of treatment, a method in which the aluminum alloy sheet treated with alkali aqueous solution is dipped into said acid aqueous solution or a method in which said acid the aqueous solution is sprayed on the aluminum alloy sheet treated with alkali aqueous solution is applied. A short duration of treatment of 1 to 30 seconds is sufficient, and that in the range of 3 to 15 seconds is more preferable. A longer duration for the treatment does not particularly hinder to obtain the state of surface in which the present invention is characterized. However, it leads to the decrease in the thickness of an aluminum alloy sheet, and it is not suitable for the high-speed continues production of thermoplastic resin-coated aluminum alloy sheet according to the present invention. There is also a method in which the surface of an aluminum alloy sheet is etched by the direct current electrolysis or the alternating current electrolysis. However, the surface of the sheet is locally etched in the treating method using electrolysis so that the desired state of surface cannot be obtained, and besides an apparatus for electrolysis is needed, which is economically undesirable. When the concentration of the inorganic acid is less than 10 g/l or when the temperature of the acid aqueous solution is below 5° C., a long time is needed for obtaining the desired state of surface, and the continuous productivity of thermoplastic resin-coated aluminum alloy sheet of the present invention is hindered, which is undesirable. Further, the concentration of inorganic acid exceeding 200 g/l does not particularly hinder to obtain the state of surface in which the present invention is characterized. However, the amount of acid aqueous solution taken out in the continuos treatment is increased, which is economically undesirable. Further, as the temperature of the acid aqueous solution rises, not only does the economical loss by heating become great, but also the corrosion of the apparatus caused by the generated mist increases, and therefore it is undesirable.

Subsequently, the aluminum alloy sheet treated with acid aqueous solution is subjected to anodic oxidation with acid solution. For anodic oxidation treatment, the similar acid as that used for etching of the aluminum alloy sheet into the above-mentioned state of surface is applied. When the kind of acid solution used for etching the aluminum alloy sheet into the above-mentioned state of surface is different from that used in the anodic oxidation treatment, rinsing is required. However, when they are the same kind of acid with the same concentration, there is no need for rinsing. Accordingly, the most effective method is to apply acid solution of the same kind and the same concentration, and to carry out the above-mentioned etching treatment in a downward path and to carry out the anodic oxidation treatment in an upward path in a vertical type treatment tank in continuous production.

In general, for a method for forming an anodic oxide film (in general, it is called "Alumite") on the surface of an aluminum alloy sheet, many methods such as a method of subjecting the sheet to a direct-current electrolysis or alternating-current electrolysis in alkali aqueous solution, in aqueous acid solution or in neutral aqueous solution are known. However, an aim thereof is mainly to improve the corrosion resistance and the scratch resistance of the sheet and to color the surface of the sheet. It is rare for these methods to aim at further coating or laminating the sheet with resin are few. Namely, Alumite-treatment is generally given on an aluminum alloy sheet which has been formed. Since the formability is not needed for Alumite itself, a considerably thick film can be formed. On the other hand, the present invention aims at developing a method for continuous high-speed production of thermoplastic resin-coated aluminum alloy sheet, an aluminum alloy sheet is laminated with a thermoplastic resin layer, subjected to a severe forming process, and further subjected the retort treatment. Therefore unlike the conventional Alumite, the anodic oxide film formed on the surface of said aluminum alloy sheet is required to have excellent adhesion with the laminated thermoplastic resin layer, and excellent adhesion after forming, even after the retort treatment, and furthermore an economical method thereof which enable a speedy treatment and which is suitable for the continuous treatment. A method in which an aluminum alloy sheet is subjected to an anodic oxidation treatment by direct-current electrolysis using an acid aqueous solution used in the above-mentioned acid solution treatment is considered to be the most preferable method for an anodic oxidation treatment which fulfills said requirements, from the aspects of the obtained properties, cost efficiency, the rinsability after the anodic oxidation treatment by direct-current electrolysis and possibility of treatment in a short time. A method in which an alkali aqueous solution is used takes a long time for rinsing an alkali solution remaining on the surface of an aluminum alloy sheet, and besides even if the alkali solution is sufficiently removed from the sheet, excellent adhesion after the retort treatment cannot be obtained, which is undesirable. Further, A method of anodic oxidation treatment by alternating-current electrolysis takes a long time. Therefore it is not suitable for the high-speed continuous production of thermoplastic resin-coated aluminum alloy sheet of the present invention.

The concentration of the acid aqueous solution used for an anodic oxidation treatment is desirably in the range of 10 to 200 g/l. When the concentration is below 10 g/l, the electric conductivity of the treating solution is low, and so it is hard to increase the current density needed for the treatment. Therefore, the formation of anodic oxide film having the prescribed thickness takes a long time, which is undesirable from the aspect of the continuous high-speed productivity. Further, when the concentration is exceeds 200 g/l, the amount of acid solution taken out by the aluminum alloy sheet is increased, which is economically undesirable. Further, the temperature of the treatment solution is desirably in the range of 30 to 80° C. Since heat is generated by electrolysis, stirring and others, cooling is required for lowering the temperature to below 30° C. The cooling is not only a cause of increase in cost, but also makes uniform anodic oxide film hard to be formed. When the temperature is over 80° C., heating of the treating solution is needed for the continuous operation, and so the cost needed for heating is increased, which is undesirable economically, Further, the corrosion of apparatus and others may be promoted, and much mist is produced, which is undesirable from the aspect of the working environment.

The anodic current density applied for the formation of anodic oxide film is desirably in the range of 2.5 to 50 A/dm2, and more preferably in the range of 3 to 20 A/dm2. When the anodic current density is less than 5 A/dm2, the formation of anodic oxide film takes a long time, which is undesirable from the aspect of productivity, and besides a uniform anodic oxide film is hard to be formed. Further, when the anodic current density is over 50 A/dm2, the voltage of electrolysis becomes too high, therefore the irregular appearance such as "burning" is produced, and a uniform and thin anodic oxide film cannot be formed, which is undesirable. Further, the duration of electrolysis depends on the thickness of formed anodic oxide film and the current density. When the current density is high, a short duration is sufficient for the electrolysis, wherein it is industrially the order of 0.1 to 2 seconds.

In case of the treatment in which hydrated oxide film is formed instead of the anodic oxide film, the surface treatment is given to the aluminum alloy sheet, which has been treated with an acid solution, by using hot water of over 60° C., boiling water or steam, Since contamination by impurity such as Ca, K, Si, and Fe into the hydrated oxide film lowers the adhesion after forming of the thermoplastic resin-coated aluminum alloy sheet, pure water and steam of pure water is suitable for the water to be used. A thin and uniform hydrated oxide film in the range of 2 to 20 nm is formed by a dipping treatment, a spraying treatment or a steam spraying treatment which is carried out for a short duration of less than 30 seconds. To form a hydrated oxide film in the range of 2 to 10 nm within 15 seconds is desirable for the better adhesion after forming of the thermoplastic resin-coated aluminum alloy sheet. When the temperature of the water is below 60° C., sufficient reaction for the formation of hydrated oxide does not take place, The temperature of the water of over 80° C. is desirable and more suitable. Of course, there is a correlation between the temperature of hot water and steam and the duration required for the treatment. If the hydrated oxide film having the same thickness is to be formed, the higher the temperature becomes, the shorter the time for the treatment can be.

Incidentally the rinsing tank following the hydrated oxide film forming treatment tank may be omitted.

In the present invention, for thermoplastic resin to be laminated on an aluminum alloy sheet, copolymer resin of one or more selected from polyethylene terephthalate, polypropylene resin, polyester resin, polyamide resin, polycarbonate resin, polyvinyl chloride resin, polyvinylidene chloride resin, and acrylic resin, copolymer of more than one of the above-mentioned resins and composite resin having two or more resins blended are available. These thermoplastic resins have different properties such as heat resistance, corrosion resistance, formability, and adhesion, respectively, and should be selected according the intended objective. Particularly, for the use in which excellent formability is required as a can in which after drawing process, a stretching process and further an ironing process are given, polyester resin, particularly polyethylene terephthalate, copolymerized polyester resin having ethylene terephthalate units as a main body, polyester resin having butylene terephthalate units as a main body, and composite resin including a blend of these resins are preferably used, and biaxially oriented films of these polyester resins are more preferably used. Further, in the case of impact resistance workability is required, multi-layered resin composed of an upper layer, a lower layer and an intermediate layer is desirable, wherein the upper layer and the lower layer are formed of the above-mentioned polyester resin, respectively, and the intermediate layer is formed of composite resin including polyester resin blended with bisphenol A polycarbonate resin or bisphenol A polycarbonate resin.

Further, in a case where the adhesion of these thermoplastic resins to an aluminum alloy sheet is insufficient, or in a case where sufficient corrosion resistance cannot be secured by thermoplastic resins alone, it becomes necessary to coat the surface of the aluminum alloy sheet with thermosetting adhesive, for example, phenol-epoxy adhesive prior to the thermoplastic resin lamination, or to coat the surface to be bonded of the thermoplastic resin film with said adhesive. However, said method of using an adhesive increases the cost and will require a measure against the environmental pollution caused by the organic solvent contained in the adhesives. Therefore, said method should only be applied when absolutely necessary.

The thickness of the laminated thermoplastic resin should be determined considering the required properties, however the thickness is desirably in the range of 5 to 50 $\mu$m, and more preferably in the range of 10 to 25 $\mu$m. In case of the formation of thermoplastic resin layer having a thickness less than 5 $\mu$m, the operatabillity is remarkably decreased in both the film-laminating method and the molten-resin extrusion laminating method. At the same time pinholes are apt to be generated, and the sufficient corrosion resistance after forming cannot be obtained. On the other hand, when the thickness is over 50 $\mu$m, the formation of thermoplastic resin layer is not economical compared with the paints used generally. Further, additives such as stabilizer, antioxidant, antistatic agent, pigment, corrosion inhibitor and others can be added to these thermoplastic resins without causing hindrance.

Next, a method for laminating thermoplastic resin on an aluminum alloy sheet is explained. Either well-known method of melt-extruding the above-mentioned thermoplastic resin and laminating an aluminum alloy sheet or a heat-laminating the above-mentioned thermoplastic resin film can be applied for laminating of the thermoplastic resin. Further, it is also possible to use a combination of both methods. In a melt resin extruding method, it is difficult to speed up the laminating speed. However, this method is suitable as the preprocess in the can production process in which thermoplastic resin layer is laminated on an aluminum alloy sheet followed by continuous deep drawing. At the same time, it is cost advantageous since it enables lamination with melt-extrusion of resin pellets. In a method in which thermoplastic resin film is heat-laminated on an aluminum alloy sheet, since melt-extrusion molding film made by forming melt-extruded resin pellets is used, it can be laminated continuously and at high speed with an aluminum alloy sheet and the thickness of the laminated thermoplastic resin layer becomes uniform, therefore this method is suitable for the high-speed mass production.

Further, in the thermoplastic resin-coated aluminum alloy sheet obtained in the producing method according to the present invention, it is also possible to interpose thermosetting resin primer such as phenol-epoxy adhesive between thermoplastic resin layer to be laminated and the surface the aluminum alloy sheet. However, the application of said primer will lead to an increase in cost. Therefore, it is desirable that this method is applied such cases as an aluminum alloy sheet intended to be used as the inside of a can where, the contents of the said can is severe corrosive, in which excellent corrosion resistance is further required, When said thermosetting primer is applied, after applying the thermosetting resin primer on an aluminum alloy sheet, thermoplastic resin may be laminated on the aluminum alloy sheet by the above mentioned method, or after applying the thermosetting resin primer on one side of the thermoplastic resin film which is to be in contact with an aluminum alloy sheet, the thermoplastic resin film may be laminated on the aluminum alloy sheet.

Then, the case in which an alkali solution treatment tank, a rinsing tank, an acid solution treatment solution tank, an rinsing tank, an anodic oxidation treatment tank, a rinsing tank, a drying device and a thermoplastic resin laminating equipment are serially arranged in order is explained. In a case of equipment where the respective tanks and the equipment are serially arranged, there is one economical merit that only one payoff reel equipment arranged on the line-inlet side and one tension reel equipment for rolling up an aluminum alloy strip arranged on the line-outlet side are enough. Further, when the waiting duration of from after an anodic oxidation treatment up to a time when an aluminum alloy sheet is laminated with thermoplastic resin becomes extremely long, it becomes a problem that the surface of an aluminum alloy sheet is polluted and deteriorated due to the contaminant from the atmosphere, and so changed. However by serially arranging, the above-mentioned equipments in a series, the waiting period of from after an anodic oxidation treatment up to a time when an aluminum alloy sheet is laminated with thermoplastic resin does not occur and the properties of thermoplastic resin-coated aluminum alloy sheet are stabled. In the same way, instead of the anodic oxidation tank, even when a hydrated oxide film forming-treatment tank is arranged, the properties of thermoplastic resin-coated aluminum alloy sheet is stabilized from the same reason. Incidentally, the rinsing tank to be provided between a hydrated oxide film forming-treatment tank and a drying oven may be omitted.

Then, the present invention is explained more concretely by referring to examples and comparative examples.

EXAMPLES

Example 1 to 10, and Comparative Example 1 to 5

In Example 1 to 10 of the present invention and Comparative example 1 to 5, an aluminum alloy sheet having the thickness of 0.26 mm (corresponding to JIS3004) was subjected to a treatment with alkali aqueous solution, thereafter was rinsed, and then was subjected to a treatment with acid aqueous solution under the condition shown in Table 1. After it was rinsed, the said sheet was subjected to an anodic oxidation treatment or to a hydrated oxide film forming-treatment under the condition shown in Table 2, thereafter it was rinsed and dried. The state of the surface of the aluminum alloy sheet before the anodic oxidation treatment or the hydrated oxide film forming-treatment, namely the maximum and the minimum diameter, and the average diameter of micro pores, the occupied area rate of micro pores and the increase rate of the specific surface were measured at five selected arbitrary points on the sheet by an atomic force microscope and an image analyzer. The surface-treated aluminum alloy sheets was heated to 240° C., and biaxially stretched copolymerized polyester resin films consisting of 85 mol % polyethylene terephthalate and 12 mol % polyethylene isophthalate (the side of to be the inner surface of the can being 25 $\mu$m and the side to be the outer surface 15 $\mu$m in thickness) was laminated at the same time on both sides of the surface-treated aluminum alloy sheets. Thereafter, the resultant laminate was immediately dipped into water, and quenched. After drying, the amounts of paraffin wax of about 50 mg/m2 was coated on both sides of the laminate, and then the laminate was subjected to the following forming process. First, blanks having the diameter of 160 mm were punched out from the laminate, and were drawn into drawn cans having a can-diameter of 100 mm. Then, the drawn can was redrawn as to be formed into a redrawn can having a can-diameter of 80 mm. It was further subjected to a combined process of simultaneous stretching and ironing, so as to be formed into stretched and ironed can having a diameter of 66 mm. This combined process was carried out under the condition where the distance between the redrawn portion corresponding to the upper end of the can and drawn and the ironed portion was 20 mm, shoulder R of the redrawing dies was 1.5 times the thickness of sheet, the clearance between the redrawing dies and the punch was 1.0 times the thickness of the sheet, and the clearance of an ironed portion became 50% of the original thickness. Then, the upper end portion of can was trimmed by a well-known method, then a necking-in forming and flanging forming were carried out. The rupturing rate of the can-wall in the obtained can body, the state of the outside surface of the can, the exposure of metal on the inside surface of can, the adhesion after forming of the thermoplastic resin layer laminated on the aluminum alloy sheet and the adhesion of the thermoplastic layer of after the retort treatment were evaluated on the standards mentioned herein under. The results of the evaluation are shown in Table 3. Incidentally the exposure of metal on the inside surface of the can were obtained by the enamel rater value (ERV) measuring method. Namely, a solution of 3% sodium chloride was packed in the obtained can body, and a stainless steel pole was dipped as a cathode. Further, with the can body as an anode, voltage of about 6.3 V is applied between both electrodes. At this time, when any portion of the aluminum alloy sheet underneath the thermoplastic resin layer was exposed, an electric current flew between both electrodes. The value of the electric current was regarded as ERV value, by which the exposure of metal on the inside surface of the can was evaluated.

A) The rupturing rate of the can-wall
 ⊚: 0%, ○: less than 10%, Δ: 10% or more and less than 30%, X: more 30%.

B) The exposure of metal on the inside of can (Evaluated by the enamel rater value (ERV)
 ⊚: 0 mA or more and less than 0.05 mA, ○: 0.05 mA or more and less than 0.5 mA, Δ: 0.5 mA or more and less than 5.0 mA, X: 5 mA or more.

C) The adhesion after forming of the laminated resin layer (Evaluated by an extent of delamination of after necking-in forming)
 ⊚: peeling off is not observed, ○: slights peeling off observed, but there is no problem in practical application,
 Δ: peeling off is considerably observed,
 X: peeling off of the entire upper end portion of the can.

D) The adhesion of the laminated resin layer after retort treatment

The obtained can body was kept in a retort oven at the temperature of 130° C. under the pressure of 1.6 kg/cm2 for 30 minutes. Thereafter, the can body was taken out of the retort oven, and the state of peeling off was evaluated.
 ⊚: peeling off not observed, ○: slight peeling off observed but there is no problem in practical application,
 Δ: peeling off is cons-iderably observed,
 X: peeling off of the entire upper end portion of the can.

The detailed conditions of the treatment and the results of Example 1 to 10, and Comparative example 1 to 5 are as shown in Tables 1 to 3. In Example 1 to 6, the treatment with alkali aqueous solution (NaOH) and the treatment with acid aqueous solution (H2SO4) were applied under the same conditions, and the same state of the surface of an aluminum alloy sheet was obtained. Further, in Example 1 to 3, the resultant sheets having the same state of the surface were subjected to different anodic oxidation treatments, respectively. In Example 4 to 6, the sheets having the same state of the surface were subjected to different hydrated oxide forming-treatment. As compared with Example 1 in which the thickness of anodic oxide was 2 nm, in Example 2 in which the thickness of anodic oxide film was 5 nm, the adhesion of the laminated thermoplastic resin layer after retort treatment was further improved. However, In Example 3 in which the thickness of anodic oxide film was 10 nm, it was again lowered. In the same manner, as compared with Example 4 in which the thickness of the hydrated oxide film was 2 nm, in Example 5 in which the thickness of the hydrated oxide film was 10 nm, the adhesion of the thermoplastic resin layer after retort treatment (D) was further improved. However, in Example 6 in which the thickness is 20 nm, it was again lowered. It is considered that the adhesion of the laminated thermoplastic resin layer after retort treatment was at the lower limit for practical use, because 2 nm the thickness of anodic oxide film and that of hydrated oxide film were thin, 2 nm, and because cracks were apt to be generated in treated films when 10 nm the thickness of anodic oxide film and 20 nm of that of hydrated oxide film were thick.

In Example 7, the properties of can body was the lower limit for practical use including the retort properties, because the amount of treatment with alkali aqueous solution and the amount of treatment with acid aqueous solution were small and the thickness of the anodic oxide film was thin, a few micro pores were formed, and the specific surface area increase rate was also low. In Example 8 to 10, various treatments with alkali aqueous solution and aqueous acid solution were applied and various anodic oxide treatment or to hydrated oxide film forming treatment were further applied. In all the Examples, the adhesion of the laminated thermoplastic resin layer after retort treatment was improved.

In Comparative example 1, the treatment with acid aqueous solution was omitted. Therefore, smuts with poor adhesion remained in a cotton-like shape on the surface. Although the ruggedness is seen on the surface before hydrated oxide film forming-treatment, micro pores were not be observed. Incidentally since the surface on which the smuts remain was subjected to a hydrated oxide film forming-treatment, the hydrated oxide film is uneven, the adhesion and the state of the surface of the sheet were poor, and the properties of the can body were insufficient. In Comparative Example 2, the treatment with alkali aqueous solution was omitted. Since grease and oxide film on the surface were not removed by alkali aqueous solution having a high-speed dissolving power, micro pores are hard to be formed, and the amount of formed micro pores greatly varies according to locating. The laminated thermoplastic resin layer applied after the anodic oxide film forming treatment was carried out on an uneven surface peeled off from the aluminum alloy sheet after the necking-in forming so that the adhesion after forming was poor. In Comparative example 3, the anodic oxidation treatment and the hydrated oxide film forming-treatment were omitted after the treatments with alkali aqueous solution and acid aqueous solution. Although the adhesion after forming of the laminated thermoplastic resin layer was sufficient, the adhesion after retort treatment was insufficient. In Comparative example 4, a thick anodic oxide film layer of 16 μm was formed, wherein cracks were generated on the anodic oxide film during forming. Therefore the adhesion after forming of the thermoplastic resin layer was deteriorated and the retort properties were inferior, In the same way, in Example 5, a thick hydrated oxide film layer of 30 nm was, wherein cracks were generated in the hydrated oxide film during forming. Therefore, the adhesion after forming of the laminated resin layer was deteriorated, and the retort properties were poor.

In Example 11 to 20 and Comparative example 6 to 10, an aluminum alloy sheet (corresponding to JIS5052) having the thickness of 0.26 mm was subjected to be the treatment with alkali solution, under the condition shown in Table 1, rinsed, subjected to the treatment with acid aqueous solution, rinsed. Thereafter, it was subjected to an anodic oxidation treatment or a hydrated oxided film forming-treatment under the condition shown in Table 2 were applied successively, rinsed and dried. The state of micro pores was measured in the same manner as Example 1. This surface-treated aluminum alloy sheet was heated to 235° C., and in Example 11 to 19 and Comparative example 6 to 10, a side of the sheet to be the inside surface of the can was laminated with a two layered-biaxially stretched polyester film made of an upper layer and a lower layer, the upper layer being made of copolymerized polyester resin with the thickness of 15 μm comprised of 88 mol % polyethylene terephthalate and 12 mol % polyethylene isophthalate, and the lower layer being made of polyester resin with the thickness of 10 μm including a blend polymer of 45 weight % copolymerized polyester resin composed of 94 mol % polyethylene terephthalate and 6 mol % polyethylene isophthalate, and 55 weight % polybutylene terephthalate resin. In Example 20, a side of the sheet to be the inside surface of the can was laminated with three layered-film made of an upper layer, an intermediate layer and a lower layer (the thickness of each being 10 μm), each of the upper layer and the lower layer being made of biaxially stretched polyester film comprised of 88 mol % polyethylene terephthalate and 12 mol % polyethylene isophthalate, and the intermediate layer being made of polyester resin including blend polymer of 45 weight % copolymerized polyester resin comprised of 94 mol % polyethylene terephthalate and 6 mol % polyethylene isophthalate, and 55 weight % bisphenol A polycarbonate resin. In all of Examples 11 to 20 and Comparative example 6 to 10, the side to be the outside surface of the can was laminated with the same biaxially stretched polyester film as in Example 1 simultaneously, just after that the laminated sheet was dipped into water and quenched. After drying, the sheet was subjected to a forming process under the same condition as Example 1 and others. The properties of the obtained can body was evaluated in the same manner as Example 1 and others. The results are shown in Table 4.

Detailed description of the condition of treatment and the results of Example 11 to 20 and Comparative example 6 to 11 are shown in Tables 1, 2, and 4. In Example 11 to 16, the same treatment with alkali aqueous solution (NaOH) and the treatment with acid aqueous solution ($H_2SO_4$) were given, so that the state of the surface of the aluminum alloy sheet became the same. In Example 11 to 13, the resultant sheet having the same the state of the surface of the aluminum alloy sheet was subjected to varied anodic oxidation treatments and in Example 14 to 16, the sheet having the same state of the surface was subjected to varied anodic hydrated oxide film forming-treatments. As compared with Example 11 in which the thickness of the anodic oxide film was 2 nm, Example 12 having a thickness of 5 nm had improved the adhesion of the laminated resin layer after retort treatment. However, in Example 13 in which the thickness of anodic oxide film was 10 nm, the adhesion of the laminated resin layer after retort treatment was again decreased. In the same manner, as compared with Example 14 in which the thickness of the hydrated oxide film was 2 nm, Example 15, having a thickness of 10 nm had improved adhesion of the laminated resin layer after retort treatment. However, in Example 16, in which the thickness of hydrated oxide film was 10 nm, the adhesion of the laminated resin layer after retort treatment was again decreased. In Example 17, the amount of the treatment with alkali aqueous solution and the amount of the treatment with the acid aqueous solution was low and the thickness of anodic oxide film was thin. The amount of formed micro pores was small, increase rate of the specific surface area was small, and the properties of can body including the retort properties was at the lower limit of practical use. In Example 18 to 20, the aluminum alloy sheet was subjected to the treatments with various alkali aqueous solution and the treatment with various acid aqueous solution, and further to various anodic oxidation treatment and various hydrated oxide film forming-treatment. In all of Example 18 to 20, the adhesion of the laminated resin layer with the sheet after retort treatment was improved.

In Comparative example 6, the treatment with acid aqueous solution was omitted, wherein after the treatment with alkali aqueous solution, smuts having insufficient adhesion remained on the surface in the cotton-like shape, and though the surface before the hydrated oxide film forming-treatment was remarkably uneven, micro pores were not observed. Because the surface of the aluminum alloy sheet on which smuts remained was subjected to the hydrated oxide film forming-treatment, formed hydrated oxide film was uneven, the adhesion and the state of the surface were undesirable, and the properties of the can body were insufficient. In Comparative example 7, the treatment with alkali aqueous solution was omitted. Since grease and oxide on the surface of the aluminum alloy sheet were not removed by the treatment with alkali aqueous solution having high dissolving speed, micro pores were hard to be formed and the amount of formed pores was greatly varied according to location. After the sheet having inferior surface evenness was subjected to an anodic oxidation treatment, the aluminum alloy sheet was laminated with resin layer. After necking-in forming process, the laminated resin layer peeled off from the sheet, wherein the adhesion after forming was poor. In Comparative example 8, an anode oxidation treatment and a hydrated oxide film forming-treatment which followed the treatment with alkali aqueous solution and the treatment with acid aqueous solution were omitted. Although the adhesion after forming was sufficient, the adhesion after retort treatment was poor. In Comparative example 9, a thick hydrated oxide film layer of 16 nm was formed, wherein cracks were generated in the anodic oxide film in the forming process, the adhesion after forming of the laminated thermoplastic resin layer was decreased and besides the retort properties were poor. In the same manner, in Comparative Example 10, a thick hydrated oxide film layer of 30 nm was formed, wherein in the forming process, cracks were generated in the hydrated oxide film, the adhesion after forming of the laminated thermoplastic resin layer was decreased and besides the retort properties were poor.

Industrial Applicability

A process for producing thermoplastic resin coated-aluminum sheet of the present invention is excellent from the aspect of the prevention of environmental pollution, high-speed productivity, and cost reduction, and even when the obtained thermoplastic resin-coated aluminum alloy sheet is subjected to a severe forming process, thermoplastic resin layer does not peel off from the sheet. Further, the thermoplastic resin-coated aluminum alloy sheet has excellent adhesion after forming, in which the laminated thermoplastic resin layer does not peel off and excellent corrosive-resistance. Therefore, it has extremely high industrial value.

TABLE 1

Conditions of the treatment with alkali solution and the treatment with acid solution in Example 1 to 20 and Comparative examples 1 to 10

| | Conditions of the treatment with alkali solution | | | | Conditions of the treatment with acid solution | | | |
| --- | --- | --- | --- | --- | --- | --- | --- | --- |
| | | Concentration (g/l) | Temp. (° C.) | Duration of treatment (sec.) | | Concentration (g/l) | Temp. (° C.) | Duration of Treatment (sec.) |
| Example 1, 11 | NaOH | 70 | 60 | 10 | $H_2SO_4$ | 70 | 25 | 10 |
| Example 2, 12 | NaOH | 70 | 60 | 10 | $H_2SO_4$ | 70 | 25 | 10 |
| Example 3, 13 | NaOH | 70 | 60 | 10 | $H_2SO_4$ | 70 | 25 | 10 |
| Example 4, 14 | NaOH | 70 | 60 | 10 | $H_2SO_4$ | 70 | 25 | 10 |
| Example 5, 15 | NaOH | 70 | 60 | 10 | $H_2SO_4$ | 70 | 25 | 10 |
| Example 6, 16 | NaOH | 70 | 60 | 10 | $H_2SO_4$ | 70 | 25 | 10 |
| Example 7, 17 | KOH | 150 | 45 | 5 | $HNO_3$ | 50 | 30 | 3 |
| Example 8, 18 | $Na_2SiO_3$ | 60 | 45 | 20 | HCl | 50 | 45 | 20 |
| Example 9, 19 | NaOH | 50 | 60 | 15 | $H_2SO_4$ | 15 | 15 | 15 |
| Example 10, 20 | $Na_2CO_3$ | 100 | 80 | 3 | HCl | 20 | 25 | 10 |
| Comp. ex. 1, 6 | NaOH | 50 | 50 | 20 | treatment omitted. | | | |
| Comp. ex. 2, 7 | treatment omitted. | | | | $H_2SO_4$ | 15 | 15 | 30 |
| Comp. ex. 3, 8 | NaOH | 70 | 60 | 10 | $H_2SO_4$ | 70 | 25 | 10 |
| Comp. ex. 4, 9 | NaOH | 100 | 60 | 10 | $H_2SO_4$ | 100 | 35 | 10 |
| Comp. ex. 5, 10 | NaOH | 100 | 60 | 10 | $H_2SO_4$ | 10 | 35 | 10 |

TABLE 2

Conditions of the anodic oxidation treatment and the hydrated oxide forming-treatment in Example to 20 and Comparative example 1 to 10

|  |  | Concentration (g/l) | Temperature (° C.) | Current density (A/dm$^2$) | Thickness of anodic oxide film or hydrated oxide film (nm) |
|---|---|---|---|---|---|
| Example 1, 9 | H$_3$PO$_4$ | 30 | 40 | 5 | 2 |
| Example 2, 10 | H$_2$SO$_4$ | 100 | 50 | 10 | 5 |
| Example 3, 11 | H$_2$SO$_4$ | 200 | 60 | 20 | 10 |
| Example 2, 10 | hot water(pure water) |  | 60 | — | 2* |
| Example 3, 11 | hot water(pure water) |  | 80 | — | 10* |
| Example 4, 12 | boiling water(pure water) |  | 100 | — | 20* |
| Example 5, 13 | tartaric acid | 50 | 55 | 8 | 2 |
| Example 6, 14 | oxalic acid | 40 | 60 | 30 | 8 |
| Example 7, 15 | citric acid | 100 | 55 | 15 | 5 |
| Example 8, 16 | steam spraying |  | 130 | — | 10* |
| Comp. ex. 1, 6 | hot water(pure water) |  | 90 | — | 5* |
| Comp. ex. 2, 7 | H$_2$SO$_4$ | 150 | 50 | 10 | 8 |
| Comp. ex. 3, 8 | treatment Omitted |  |  |  |  |
| Comp. ex. 4, 9 | Na$_2$CO$_3$ | 50 | 40 | 10 | 16 |
| Comp. ex. 5, 10 | boiling water(pure water) |  | 100 | — | 30* |

*Thickness of hydrated oxide film

TABLE 3

The state of the surface of the aluminium alloy sheet and the properties thereof in Example 1 to 10 and Comparative example 1 to 5

|  | The state of formed micro pores |  |  |  | Properties of can body |  |  |  |
|---|---|---|---|---|---|---|---|---|
|  | Max. diam. (Min. diam.) (nm) | Max. depth (Ave. diam.) (nm) | Occupied area rate by micro pores (%) | Increase rate of specific surface area (%) | A | B | C | D |
| Example 1 | 1200 (75) | 500 (575) | 80 | 18 | ◎ | ◎ | ◎ | ○ |
| Example 2 | 1200 (75) | 500 (575) | 80 | 18 | ◎ | ◎ | ◎ | ◎ |
| Example 3 | 1200 (75) | 500 (575) | 80 | 18 | ◎ | ◎ | ◎ | ○ |
| Example 4 | 1200 (75) | 500 (575) | 80 | 18 | ◎ | ◎ | ◎ | ○ |
| Example 5 | 1200 (75) | 500 (575) | 80 | 18 | ◎ | ◎ | ◎ | ◎ |
| Example 6 | 1200 (75) | 500 (575) | 80 | 18 | ◎ | ◎ | ◎ | ○ |
| Example 7 | 500 (50) | 200 (280) | 10 | 3 | ○ | ○ | ○ | ○ |
| Example 8 | 3000 (150) | 950 (900) | 90 | 29 | ○ | ○ | ○ | ◎ |
| Example 9 | 900 (75) | 350 (430) | 42 | 12.5 | ◎ | ◎ | ◎ | ◎ |
| Example 10 | 1500 (100) | 700 (625) | 30 | 9.8 | ○ | ◎ | ○ | ◎ |
| Comp. ex. 1 | — (—) | 1200 (—) | — | 32 | X | X | X | X |
| Comp. ex. 2 | 450 (50) | 150 (300) | 7.5 | 2.8 | ○ | ○ | Δ | ○ |
| Comp. ex. 3 | 1200 (75) | 560 (575) | 80 | 18 | ◎ | ◎ | ◎ | Δ |
| Comp. ex. 4 | 1700 (125) | 800 (690) | 88 | 28 | ○ | ○ | Δ | Δ |
| Comp. ex. 5 | 1700 (125) | 800 (690) | 88 | 28 | ○ | ○ | Δ | Δ |

TABLE 4

The state of the surface of the aluminium alloy sheet and the properties thereof in Example 11 to 20 and Comparative example 6 to 10

| | The state of formed fine holes | | | | Properties of can body | | | |
|---|---|---|---|---|---|---|---|---|
| | Max. diam. (Min. diam.) (nm) | Max. depth (Ave. diam.) (nm) | Occupied area rate by micro pores (%) | Increase rate of specific surface area (%) | A | B | C | D |
| Example 11 | 1250 (100) | 600 (600) | 85 | 20 | ◎ | ◎ | ◎ | ○ |
| Example 12 | 1250 (100) | 600 (600) | 85 | 20 | ◎ | ◎ | ◎ | ◎ |
| Example 13 | 1250 (100) | 600 (600) | 85 | 20 | ◎ | ◎ | ◎ | ○ |
| Example 14 | 1250 (100) | 600 (600) | 85 | 20 | ◎ | ◎ | ◎ | ○ |
| Example 15 | 1250 (100) | 600 (600) | 85 | 20 | ◎ | ◎ | ◎ | ◎ |
| Example 16 | 1250 (100) | 600 (600) | 85 | 20 | ◎ | ◎ | ◎ | ○ |
| Example 17 | 550 (75) | 250 (290) | 12 | 5 | ○ | ○ | ○ | ○ |
| Example 18 | 3000 (150) | 1000 (900) | 95 | 30 | ○ | ○ | ○ | ◎ |
| Example 19 | 1500 (100) | 600 (625) | 45 | 13.5 | ◎ | ◎ | ○ | ◎ |
| Example 20 | 1750 (125) | 750 (690) | 33 | 9.9 | ○ | ◎ | ○ | ◎ |
| Comp. ex. 6 | — (—) | 1300 (—) | — | 35.5 | X | X | X | X |
| Comp. ex. 7 | 450 (50) | 150 (300) | 7.5 | 2.8 | ○ | ○ | Δ | ○ |
| Comp. ex. 8 | 1250 (100) | 600 (600) | 85 | 20 | ◎ | ◎ | ◎ | Δ |
| Comp. ex. 9 | 1900 (125) | 900 (720) | 90 | 29 | ○ | ○ | Δ | Δ |
| Comp. ex. 10 | 1900 (125) | 900 (720) | 90 | 29 | ○ | ○ | Δ | Δ |

What is claimed is:

1. A thermoplastic resin coated-aluminum alloy sheet comprising an aluminum alloy sheet as a base sheet, wherein said aluminum alloy sheet is subjected to a treatment with alkali solution, and then to a treatment with acid solution so as to put the surface of the aluminum alloy sheet in such a condition that the increase rate of specific surface area is 3 to 30%, and then the resultant sheet is subjected to an anodic oxidation treatment, thereafter at least one side of said base sheet is laminated with thermoplastic resin.

2. A thermoplastic resin coated-aluminum alloy sheet as claimed in claim 1, wherein the thickness of the oxide film formed by said anodic oxidation treatment is 2 to 10 nm.

3. A thermoplastic resin coated-aluminum alloy sheet as claimed in claim 2, wherein micro pores are formed on the surface of the aluminium alloy sheet after the treatment with acid solution, the diameter of each micro pore being 50 to 3000 nm, the maximum depth thereof is 1000 nm or less, and the occupied area rate by micro pores being 10 to 95%.

4. A process for producing thermoplastic resin coated-aluminum alloy sheet as claimed in claim 2, wherein an aluminum alloy sheet as a base sheet is subjected to a treatment with alkali solution containing mainly 10 to 100 g/l of one or more selected from the group consisting of hydroxide, carbonate, bicarbonate, phosphate, silicate and borate of alkali metal or ammonium, and then to a treatment with acid solution containing mainly 10 to 300 g/l of one or more selected from the group consisting of sulfuric acid, hydrochloric acid, nitric acid, phosphoric acid, boric acid, carboxylic acid and hydroxy carboxylic acid.

5. A process for producing thermoplastic resin coated-aluminum alloy sheet as claimed in claim 2, wherein said aluminum alloy sheet after said treatment with acid solution is subjected to an anodic oxidation treatment using acid solution containing mainly 10 to 100 g/l of one or more selected from the group consisting of sulfuric acid, phosphoric acid, carboxylic acid and hydroxy carboxylic acid at a temperature of 30 to 80° C. and with current density of 2.5 to 50 A/dm$^2$.

6. A process for producing thermoplastic resin coated-aluminum alloy sheet as claimed in claim 2, wherein said treatment with alkali solution is a treatment in which said aluminum alloy sheet is dipped into alkali solution or a treatment in which alkali solution is sprayed on the aluminum alloy sheet, and said treatment with acid solution is a treatment in which the aluminum alloy sheet is dipped into acid solution or a treatment in which acid solution is sprayed on said aluminum alloy sheet.

7. A thermoplastic resin coated-aluminum alloy sheet as claimed in claim 2, wherein said thermoplastic resin is polyethylene terephthalate, copolymerized polyester resin having, as a main body, ethylene terephthalate units, polyester resin having, as a main body, butylene terephthalate units, or blend polymer of these polyester resins and/or multi-layered composite resin of these polyester resins.

8. A thermoplastic resin coated-aluminum alloy sheet as claimed in claim 2, wherein the coating resin is multi-layered resin composed of an upper layer, a lower layer and an intermediate layer, in which said upper layer and said lower layer are formed of polyester resin, and an intermediate layer is formed of composite resin including polyester resin blended with bisphenol A polycarbonate resin or composite resin made of polyester resin and bisphenol A polycarbonate resin.

9. An apparatus for producing thermoplastic resin coated-aluminum alloy sheet as claimed in claim 2, wherein an alkali solution treatment tank, a rinsing tank, an acid solution treatment tan, a rinsing tank, an anodic oxidation treatment tank, a rinsing tank, a drying device and a thermoplastic resin laminating equipment are serially arranged in order.

10. A thermoplastic resin coated-aluminum alloy sheet as claimed in claim 3, wherein said micro pores are formed hollowed out from the surface of the aluminium alloy sheet in the direction of thickness with an average diameter of 200 to 900 nm, and a depth ½ or less of said diameter.

11. A process for producing thermoplastic resin coated-aluminum alloy sheet as claimed in claim 10, wherein an aluminum alloy sheet as a base sheet is subjected to a treatment with alkali solution containing mainly 10 to 100 g/l of one or more selected from the group consisting of hydroxide, carbonate, bicarbonate, phosphate, silicate and borate of alkali metal or ammonium, and then to a treatment with acid solution containing mainly 10 to 300 g/l of one or more selected from the group consisting of sulfuric acid, hydrochloric acid, nitric acid, phosphoric acid, boric acid, carboxylic acid and hydroxy carboxylic acid.

12. A process for producing thermoplastic resin coated-aluminum alloy sheet as claimed in claim 10, wherein said aluminum alloy sheet after said treatment with acid solution is subjected to an anodic oxidation treatment using acid solution containing mainly 10 to 100 g/l of one or more selected from the group consisting of sulfuric acid, phosphoric acid, carboxylic acid and hydroxy carboxylic acid at a temperature of 30 to 80° C. and with current density of 2.5 to 50 A/dm$^2$.

13. A process for producing thermoplastic resin coated-aluminum alloy sheet as claimed in claim 10, wherein said treatment with alkali solution is a treatment in which said aluminum alloy sheet is dipped into alkali solution or a treatment in which alkali solution is sprayed on the aluminum alloy sheet, and said treatment with acid solution is a treatment in which the aluminum alloy sheet is dipped into acid solution or a treatment in which acid solution is sprayed on said aluminum alloy sheet.

14. A process for producing thermoplastic resin coated-aluminum alloy sheet as claimed in claim 13, wherein said carboxylic acid is oxalic acid or acetic acid, and said hydroxy carboxylic acid is citric acid, tartaric acid or lactic acid.

15. A process for producing thermoplastic resin coated-aluminum alloy sheet as claimed in claim 12, wherein said carboxylic acid is oxalic acid or acetic acid, and said hydroxy carboxylic acid is citric acid, tartaric acid or lactic acid.

16. A thermoplastic resin coated-aluminum alloy sheet as claimed in claim 10, wherein said thermoplastic resin is polyethylene terephthalate, copolymerized polyester resin having, as a main body, ethylene terephthalate units, polyester resin having, as a main body, butylene terephthalate units, or blend polymer of these polyester resins and/or multi-layered composite resin of these polyester resins.

17. A thermoplastic resin coated-aluminum alloy sheet as claimed in claim 10, wherein the coating resin is multi-layered resin composed of an upper layer, a lower layer and an intermediate layer, in which said upper layer and said lower layer are formed of polyester resin, and an intermediate layer is formed of composite resin including polyester resin blended with bisphenol A polycarbonate resin or composite resin made of polyester resin and bisphenol A polycarbonate resin.

18. An apparatus for producing thermoplastic resin coated-aluminum alloy sheet as claimed in claim 10, wherein an alkali solution treatment tank, a rinsing tank, an acid solution treatment tan, a rinsing tank, an anodic oxidation treatment tank, a rinsing tank, a drying device and a thermoplastic resin laminating equipment are serially arranged in order.

19. A thermoplastic resin coated-aluminum alloy sheet as claimed in claim 1, wherein micro pores are formed on the surface of the aluminum alloy sheet after the treatment with acid solution, the diameter of each micro pore being 50 to 3000 nm, the maximum depth thereof is 1000 nm or less, and the occupied area rate by micro pores being 10 to 95%.

20. A thermoplastic resin coated-aluminum alloy sheet as claimed in claim 19, wherein said micro pores are formed hollowed out from the surface of the aluminum alloy sheet in the direction of thickness with an average diameter of 200 to 900 nm, and a depth of ½ or less of said diameter.

21. A process for producing thermoplastic resin coated-aluminum alloy sheet as claimed in claim 1, wherein an aluminum alloy sheet as a base sheet is subjected to a treatment with alkali solution containing mainly 10 to 200 g/l of one or more selected from the group consisting of hydroxide, carbonate, bicarbonate, phosphate, silicate and borate of alkali metal or ammonium, and then to a treatment with acid solution containing mainly 10 to 300 g/l of one or more selected from the group consisting of sulfuric acid, hydrochloric acid, nitric acid, phosphoric acid, boric acid, carboxylic acid and hydroxy carboxylic acid.

22. A process for producing thermoplastic resin coated-aluminum alloy sheet as claimed in claim 21, wherein said carboxylic acid is oxalic acid or acetic acid, and said hydroxy carboxylic acid is citric acid, tartaric acid or lactic acid.

23. A process for producing thermoplastic resin coated-aluminum alloy sheet as claimed in claim 1, wherein said aluminum alloy sheet after said treatment with acid solution is subjected to an anodic oxidation treatment using acid solution containing mainly 10 to 100 g/l of one or more selected from the group consisting of sulfuric acid, phosphoric acid, carboxylic acid and hydroxy carboxylic acid at a temperature of 30 to 80° C. and with current density of 2.5 to 50 A/dm$^2$.

24. A process for producing thermoplastic resin coated-aluminum alloy sheet as claimed in claim 23, wherein said carboxylic acid is oxalic acid or acetic acid, and said hydroxy carboxylic acid is citric acid, tartaric acid or lactic acid.

25. A process for producing thermoplastic resin coated-aluminum alloy sheet as claimed in claim 1, wherein said treatment with alkali solution is a treatment in which said aluminum alloy sheet is dipped into alkali solution or a treatment in which alkali solution is sprayed on the aluminum alloy sheet, and said treatment with acid solution is a treatment in which the aluminum alloy sheet is dipped into acid solution or a treatment in which acid solution is sprayed on said aluminum alloy sheet.

26. A thermoplastic resin coated-aluminum alloy sheet as claimed in claim 1, wherein said thermoplastic resin is polyethylene terephthalate, copolymerized polyester resin having, as a main body, butylene terephthalate units, or blend polymer of these polyester resins and/or multi-layered composite resin of these polyester resins.

27. A thermoplastic resin coated-aluminum alloy sheet as claimed in claim 1, wherein the coating resin is multi-layered resin composed of an upper layer, a lower layer and an intermediate layer, in which said upper layer and said lower layer are formed of polyester resin, and an intermediate layer is formed of composite resin including polyester resin blended with bisphenol A polycarbonate resin or composite resin made of polyester resin and bisphenol A polycarbonate resin.

28. An apparatus for producing thermoplastic resin coated-aluminum alloy sheet as claimed in claim 1, wherein an alkali solution treatment tank, a rinsing tank, an acidic solution treatment tank, a rinsing tank, an anodic oxidation treatment tank, a rinsing tank, a drying device and a thermoplastic resin laminating equipment are serially arranged in order.

29. A thermoplastic resin coated-aluminum alloy sheet comprising an aluminum alloy sheet as a base sheet, wherein said aluminum alloy sheet is subjected to a treatment with alkali solution, and then to a treatment with acid solution so as to put the surface of the aluminum alloy sheet in such a condition that the increase rate of specific surface area is 3 to 30%, and then the resultant base sheet is subjected to a hydrated oxide film forming-treatment with hot water of above 60° C., boiling water or stream so as to form a hydrated oxide film, thereafter at least one side of said base sheet is laminated with thermoplastic resin.

30. A thermoplastic resin coated-aluminum alloy sheet as claimed in claim 29, wherein the thickness of hydrated oxide film formed by said hydrated oxide film forming-treatment is 2 to 20 nm.

31. A thermoplastic resin coated-aluminum alloy sheet as claimed in claim 30, wherein micro pores are formed on the surface of the aluminum alloy sheet after the treatment with acid solution, the diameter of each micro pore being 50 to 3000 nm, the maximum depth thereof is 1000 nm or less, and the occupied area rate by micro pores being 10 to 95%.

32. A process for producing thermoplastic resin coated-aluminum alloy sheet as claimed in claim 30, wherein an aluminum alloy sheet as a base sheet is subjected to a treatment with alkali solution containing mainly 10 to 100 g/l of one or more selected from the group consisting of hydroxide, carbonate, bicarbonate, phosphate, silicate and borate of alkali metal or ammonium, and then to a treatment with acid solution containing mainly 10 to 300 g/l of one or more selected from the group consisting of sulfuric acid, hydrochloric acid, nitric acid, phosphoric acid, boric acid, carboxylic acid and hydroxy carboxylic acid.

33. A process for producing thermoplastic resin coated-aluminum alloy sheet as claimed in claim 31, wherein an aluminum alloy sheet as a base sheet is subjected to a treatment with alkali solution containing mainly 10 to 100 g/l of one or more selected from the group consisting of hydroxide, carbonate, bicarbonate, phosphate, silicate and borate of alkali metal or ammonium, and then to a treatment with acid solution containing mainly 10 to 300 g/l of one or more selected from the group consisting of sulfuric acid, hydrochloric acid, nitric acid, phosphoric acid, boric acid, carboxylic acid and hydroxy carboxylic acid.

34. A process for producing thermoplastic resin coated-aluminum alloy sheet as claimed in claim 31, wherein said aluminum alloy sheet after said treatment with acid solution is subjected to an anodic oxidation treatment using acid solution containing mainly 10 to 100 g/l of one or more selected from the group consisting of sulfuric acid, phosphoric acid, carboxylic acid and hydroxy carboxylic acid at a temperature of 30 to 80° C. and with current density of 2.5 to 50 A/dm$^2$.

35. A process for producing thermoplastic resin coated-aluminum alloy sheet as claimed in claim 30, wherein said treatment with alkali solution is a treatment in which said aluminum alloy sheet is dipped into alkali solution or a treatment in which alkali solution is sprayed on the aluminum alloy sheet, and said treatment with acid solution is a treatment in which the aluminum alloy sheet is dipped into acid solution or a treatment in which acid solution is sprayed on said aluminum alloy sheet.

36. A thermoplastic resin coated-aluminum alloy sheet as claimed in claim 30, wherein said thermoplastic resin is polyethylene terephthalate, copolymerized polyester resin having, as a main body, ethylene terephthalate units, polyester resin having, as a main body, butylene terephthalate units, or blend polymer of these polyester resins and/or multi-layered composite resin of these polyester resins.

37. A thermoplastic resin coated-aluminum alloy sheet as claimed in claim 30, wherein the coating resin is multi-layered resin composed of an upper layer, a lower layer and an intermediate layer, in which said upper layer and said lower layer are formed of polyester resin, and an intermediate layer is formed of composite resin including polyester resin blended with bisphenol A polycarbonate resin or composite resin made of polyester resin and bisphenol A polycarbonate resin.

38. An apparatus for producing thermoplastic resin coated-aluminum alloy sheet as claimed in claim 30, wherein an alkali solution treatment tank, a rinsing tank, an acid solution treatment tank, a rinsing tank, a hydrated oxide film forming-treatment tank, a drying device and a thermoplastic resin laminating equipment are serially arranged in order.

39. A thermoplastic resin coated-aluminum alloy sheet as claimed in claim 31, wherein said micro pores are formed hollowed out from the surface of the aluminum alloy sheet in the direction of thickness with an average diameter of 200 to 900 nm, and a depth ½ or less of said diameter.

40. A process for producing thermoplastic resin coated-aluminum alloy sheet as claimed in claim 31, wherein said treatment with alkali solution is a treatment in which said aluminum alloy sheet is dipped into alkali solution or a treatment in which alkali solution is sprayed on the aluminum alloy sheet, and said treatment with acid solution is a treatment in which the aluminum alloy sheet is dipped into acid solution or a treatment in which acid solution is sprayed on said aluminum alloy sheet.

41. A thermoplastic resin coated-aluminum alloy sheet as claimed in claim 31, wherein said thermoplastic resin is polyethylene terephthalate, copolymerized polyester resin having, as a main body, ethylene terephthalate units, polyester resin having, as a main body, butylene terephthalate units, or blend polymer of these polyester resins and/or multi-layered composite resin of these polyester resins.

42. A thermoplastic resin coated-aluminum alloy sheet as claimed in claim 31, wherein the coating resin is multi-layered resin composed of an upper layer, a lower layer and an intermediate layer, in which said upper layer and said lower layer are formed of polyester resin, and an intermediate layer is formed of composite resin including polyester resin blended with bisphenol A polycarbonate resin or composite resin made of polyester resin and bisphenol A polycarbonate resin.

43. An apparatus for producing thermoplastic resin coated-aluminum alloy sheet as claimed in claim 31, wherein an alkali solution treatment tank, a rinsing tank, an acid solution treatment tan, a rinsing tank, an anodic oxidation treatment tank, a rinsing tank, a drying device and a thermoplastic resin laminating equipment are serially arranged in order.

44. An apparatus for producing thermoplastic resin coated-aluminum alloy sheet as claimed in claim 31, wherein an alkali solution treatment tank, a rinsing tank, an acid solution treatment tank, a rinsing tank, a hydrated oxide film forming-treatment tank, a drying device and a thermoplastic resin laminating equipment are serially arranged in order.

45. A process for producing thermoplastic resin coated-aluminum alloy sheet as claimed in claim 39, wherein an aluminum alloy sheet as a base sheet is subjected to a treatment with alkali solution containing mainly 10 to 200 g/l of one or more selected from the group consisting of hydroxide, carbonate, bicarbonate, phosphate, silicate and borate of alkali metal or ammonium, and then to a treatment with acid solution containing mainly 10 to 300 g/l of one or more selected from the group consisting of sulfuric acid, hydrochloric acid, nitric acid, phosphoric acid, boric acid, carboxylic acid and hydroxy carboxylic acid.

46. A process for producing thermoplastic resin coated-aluminum alloy sheet as claimed in claim 45, wherein said carboxylic acid is oxalic acid or acetic acid, and said hydroxy carboxylic acid is citric acid, tartaric acid or lactic acid.

47. A process for producing thermoplastic resin coated-aluminum alloy sheet as claimed in claim 39, wherein said aluminum alloy sheet after said treatment with acid solution is subjected to an anodic oxidation treatment using acid solution containing mainly 10 to 100 g/l of one or more selected from the group consisting of sulfuric acid, phosphoric acid, carboxylic acid and hydroxy carboxylic acid at a temperature of 30 to 80° C. and with current density of 2.5 to 50 A/dm$^2$.

48. A process for producing thermoplastic resin coated-aluminum alloy sheet as claimed in claim 47, wherein said carboxylic acid is oxalic acid or acetic acid, and said hydroxy carboxylic acid is citric acid, tartaric acid or lactic acid.

49. A process for producing thermoplastic resin coated-aluminum alloy sheet as claimed in claim 39, wherein said treatment with alkali solution is a treatment in which said aluminum alloy sheet is dipped into alkali solution or a treatment in which alkali solution is sprayed on the aluminum alloy sheet, and said treatment with acid solution is a treatment in which the aluminum alloy sheet is dipped into acid solution or a treatment in which acid solution is sprayed on said aluminum alloy sheet.

50. A thermoplastic resin coated-aluminum alloy sheet as claimed in claim 39, wherein said thermoplastic resin is polyethylene terephthalate, copolymerized polyester resin having, as a main body, ethylene terephthalate units, polyester resin having, as a main body, butylene terephthalate units, or blend polymer of these polyester resins and/or multi-layered composite resin of these polyester resins.

51. A thermoplastic resin coated-aluminum alloy sheet as claimed in claim 39, wherein the coating resin is multi-layered resin composed of an upper layer, a lower layer and an intermediate layer, in which said upper layer and said lower layer are formed of polyester resin, and an intermediate layer is formed of composite resin including polyester resin blended with bisphenol A polycarbonate resin or composite resin made of polyester resin and bisphenol A polycarbonate resin.

52. An apparatus for producing thermoplastic resin coated-aluminum alloy sheet as claimed in claim 39, wherein an alkali solution treatment tank, a rinsing tank, an acid solution treatment tank, a rinsing tank, an anodic oxidation treatment tank, a rinsing tank, a drying device and a thermoplastic resin laminating equipment are serially aranged in order.

53. An apparatus for producing thermoplastic resin coated-aluminum alloy sheet as claimed in claim 39, wherein an alkali solution treatment tank, a rinsing tank, an acid solution treatment tank, a rinsing tank, a hydrated oxide film forming-treatment tank, a drying device and a thermoplastic resin laminating equipment are serially arranged in order.

54. An apparatus for producing thermoplastic resin coated-aluminum alloy sheet as claimed in claim 29, wherein an alkali solution treatment tank, a rinsing tank, an acid solution treatment tank, a rinsing tank, a hydrated oxide film forming-treatment tank, a drying device and a thermoplastic resin laminating equipment are serially arranged in order.

55. A thermoplastic resin coated-aluminum alloy sheet as claimed in claim 29, wherein micro pores are formed on the surface of the aluminium alloy sheet after the treatment with acid solution, the diameter of each micro pore being 50 to 3000 nm, the maximum depth thereof is 1000 nm or less, and the occupied area rate by micro pores being 10 to 95%.

56. A thermoplastic resin coated-aluminum alloy sheet as claimed in claim 55, wherein said micro pores are formed hollowed out from the surface of the aluminium alloy sheet in the direction of thickness with an average diameter of 200 to 900 nm, and a depth ½ or less of said diameter.

57. A process for producing thermoplastic resin coated-aluminum alloy sheet as claimed in claim 56, wherein an aluminum alloy sheet as a base sheet is subjected to a treatment with alkali solution containing mainly 10 to 100 g/l of one or more selected from the group consisting of hydroxide, carbonate, bicarbonate, phosphate, silicate and borate of alkali metal or ammonium, and then to a treatment with acid solution containing mainly 10 to 300 g/l of one or more selected from the group consisting of sulfuric acid, hydrochloric acid, nitric acid, phosphoric acid, boric acid, carboxylic acid and hydroxy carboxylic acid.

58. A process for producing thermoplastic resin coated-aluminum alloy sheet as claimed in claim 56, wherein said treatment with alkali solution is a treatment in which said aluminum alloy sheet is dipped into alkali solution or a treatment in which alkali solution is sprayed on the aluminum alloy sheet, and said treatment with acid solution is a treatment in which the aluminum alloy sheet is dipped into acid solution or a treatment in which acid solution is sprayed on said aluminum alloy sheet.

59. A process for producing thermoplastic resin coated-aluminum alloy sheet as claimed in claim 56, wherein said carboxylic acid is oxalic acid or acetic acid, and said hydroxy carboxylic acid is citric acid, tartaric acid or lactic acid.

60. A thermoplastic resin coated-aluminum alloy sheet as claimed in claim 56, wherein said thermoplastic resin is polyethylene terephthalate, copolymerized polyester resin having, as a main body, ethylene terephthalate units, polyester resin having, as a main body, butylene terephthalate units, or blend polymer of these polyester resins and/or multi-layered composite resin of these polyester resins.

61. A thermoplastic resin coated-aluminum alloy sheet as claimed in claim 56, wherein the coating resin is multi-layered resin composed of an upper layer, a lower layer and an intermediate layer, in which said upper layer and said lower layer are formed of polyester resin, and an intermediate layer is formed of composite resin including polyester resin blended with bisphenol A polycarbonate resin or composite resin made of polyester resin and bisphenol A polycarbonate resin.

62. An apparatus for producing thermoplastic resin coated-aluminum alloy sheet as claimed in claim 56, wherein an alkali solution treatment tank, a rinsing tank, an acid solution treatment tank, a rinsing tank, a hydrated oxide film forming-treatment tank, a drying device and a thermoplastic resin laminating equipment are serially arranged in order.

63. A process for producing thermoplastic resin coated-aluminum alloy sheet as claimed in claim 29, wherein an aluminum alloy sheet as a base sheet is subjected to a treatment with alkali solution containing mainly 10 to 100 g/l of one or more selected from the group consisting of hydroxide, carbonate, bicarbonate, phosphate, silicate and borate of alkali metal or ammonium, and then to a treatment with acid solution containing mainly 10 to 300 g/l of one or more selected from the group consisting of sulfuric acid, hydrochloric acid, nitric acid, phosphoric acid, boric acid, carboxylic acid and hydroxy carboxylic acid.

64. A process for producing thermoplastic resin coated-aluminum alloy sheet as claimed in claim 29, wherein said treatment with alkali solution is a treatment in which said aluminum alloy sheet is dipped into alkali solution or a treatment in which alkali solution is sprayed on the aluminum alloy sheet, and said treatment with acid solution is a treatment in which the aluminum alloy sheet is dipped into acid solution or a treatment in which acid solution is sprayed on said aluminum alloy sheet.

65. A thermoplastic resin coated-aluminum alloy sheet as claimed in claim 29, wherein said thermoplastic resin is polyethylene terephthalate, copolymerized polyester resin having, as a main body, ethylene terephthalate units, polyester resin having, as a main body, butylene terephthalate units, or blend polymer of these polyester resins and/or multi-layered composite resin of these polyester resins.

66. A thermoplastic resin coated-aluminum alloy sheet as claimed in claim 29, wherein the coating resin is multi-layered resin composed of an upper layer, a lower layer and an intermediate layer, in which said upper layer and said lower layer are formed of polyester resin, and an intermediate layer is formed of composite resin including polyester resin blended with bisphenol A polycarbonate resin or composite resin made of polyester resin and bisphenol A polycarbonate resin.

* * * * *